(12) United States Patent
Hancock

(10) Patent No.: US 9,744,961 B2
(45) Date of Patent: Aug. 29, 2017

(54) HYBRID ELECTRIC VEHICLE CONTROLLER AND METHOD OF CONTROLLING A HYBRID ELECTRIC VEHICLE

(75) Inventor: Matthew Hancock, Whitley (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 265 days.

(21) Appl. No.: 13/983,235

(22) PCT Filed: Jan. 31, 2012

(86) PCT No.: PCT/EP2012/051486
§ 371 (c)(1),
(2), (4) Date: Oct. 14, 2013

(87) PCT Pub. No.: WO2012/104266
PCT Pub. Date: Aug. 9, 2012

(65) Prior Publication Data
US 2014/0114518 A1    Apr. 24, 2014

(30) Foreign Application Priority Data
Feb. 1, 2011    (GB) .................................. 1101704.3

(51) Int. Cl.
*B60W 20/00*    (2016.01)
*B60K 6/48*    (2007.10)
(Continued)

(52) U.S. Cl.
CPC .............. *B60W 20/00* (2013.01); *B60K 6/48* (2013.01); *B60W 10/02* (2013.01); *B60W 10/06* (2013.01);
(Continued)

(58) Field of Classification Search
USPC ......... 701/22, 67; 180/65.275, 65.28, 65.21; 903/945, 946; 477/5–8, 176
See application file for complete search history.

(56) References Cited

U.S. PATENT DOCUMENTS 4,416,360 A * 11/1983 Fiala ........................ B60K 6/30
180/165
5,343,970 A * 9/1994 Severinsky ............ B60K 6/387
180/165
(Continued)

FOREIGN PATENT DOCUMENTS

CN    101186208 A    5/2008
CN    101456347 A    6/2009
(Continued)

OTHER PUBLICATIONS

Automotive Electric Motors, Generators, and Actuator Drive Systems With Reduced or No Permanent Magnets and Innovative Design Concepts; Dorrell, D. ; Parsa, L. ; Boldea, I.; Industrial Electronics, IEEE Transactions on; vol. 61 , Issue: 10 DOI: 10.1109/TIE.2014.2307839; Publication Year: 2014 , pp. 5693-5695.*

(Continued)

*Primary Examiner* — Cuong H Nguyen
(74) *Attorney, Agent, or Firm* — Myers Bigel, P.A.

(57) ABSTRACT

Embodiments of the present invention provide a controller for a hybrid electric vehicle having a first actuator and a second actuator operable to drive a driveline of the vehicle, the vehicle having releasable torque transmitting means operable releasably to couple the first actuator to the driveline, the releasable torque transmitting means being operable between a first condition in which the first actuator is substantially disconnected from the driveline and a second condition in which the first actuator is substantially connected to the driveline, the controller being operable to control the vehicle to transition between a first mode in (Continued)

which the releasable torque transmitting means is in the first condition and a second mode in which the releasable torque transmitting means is in the second condition, when a transition from the first mode to the second mode is required the controller being arranged to provide a control signal to the first actuator to control the speed thereof, the control signal being responsive to the speed of the first actuator and the amount of torque transfer provided by the releasable torque transmitting means.

32 Claims, 2 Drawing Sheets

(51) Int. Cl.
  *B60W 10/02* (2006.01)
  *B60W 10/06* (2006.01)
  *B60W 50/00* (2006.01)

(52) U.S. Cl.
  CPC .............. *B60W 2050/0008* (2013.01); *B60W 2050/0011* (2013.01); *B60W 2510/0216* (2013.01); *B60W 2510/0225* (2013.01); *B60W 2510/0275* (2013.01); *B60W 2510/0638* (2013.01); *B60W 2510/0676* (2013.01); *B60W 2710/0644* (2013.01); *Y02T 10/6221* (2013.01); *Y10S 903/946* (2013.01)

(56) References Cited

U.S. PATENT DOCUMENTS

| | | | |
|---|---|---|---|
| 5,815,824 A | 9/1998 | Saga et al. | |
| 5,842,534 A | 12/1998 | Frank | |
| 6,336,889 B1* | 1/2002 | Oba | B60K 6/365 477/5 |
| 6,407,524 B1* | 6/2002 | Endo et al. | 318/432 |
| 6,868,926 B2* | 3/2005 | Boggs | B60K 6/365 123/352 |
| 7,256,510 B2* | 8/2007 | Holmes | B60K 6/365 180/65.1 |
| 7,611,433 B2* | 11/2009 | Forsyth | 475/5 |
| 7,766,107 B2* | 8/2010 | Joe et al. | 180/65.21 |
| 7,766,108 B2 | 8/2010 | Rimaux et al. | |
| 7,878,281 B2* | 2/2011 | Tanishima | 180/65.265 |
| 7,881,830 B2* | 2/2011 | Yasui et al. | 700/299 |
| 8,055,416 B2* | 11/2011 | Matsubara et al. | 701/54 |
| 8,095,255 B2* | 1/2012 | Ebuchi et al. | 701/22 |
| 8,116,957 B2* | 2/2012 | Oh et al. | 701/67 |
| 8,249,785 B2* | 8/2012 | Tokura et al. | 701/55 |
| 8,251,866 B2* | 8/2012 | Kaltenbach | 477/5 |
| 8,308,605 B2* | 11/2012 | Kaltenbach et al. | 477/5 |
| 8,529,399 B2* | 9/2013 | Schenk et al. | 477/3 |
| 8,798,839 B2* | 8/2014 | Yamanaka | B60K 6/48 475/1 |
| 8,900,095 B2* | 12/2014 | Whitney | B60W 10/11 477/109 |
| 8,965,650 B1* | 2/2015 | Otanez | B60W 20/30 701/22 |
| 9,365,105 B2* | 6/2016 | Tesar | F16D 13/26 |
| 2002/0029624 A1 | 3/2002 | Gassner et al. | |
| 2004/0006414 A1 | 1/2004 | Suzuki | |
| 2005/0155803 A1* | 7/2005 | Schiele | 180/65.2 |
| 2005/0178593 A1* | 8/2005 | Oshidari | 180/65.2 |
| 2007/0246554 A1 | 10/2007 | Watanabe et al. | |
| 2007/0275823 A1* | 11/2007 | Motosugi | B60K 6/48 477/176 |
| 2008/0058154 A1* | 3/2008 | Ashizawa et al. | 477/5 |
| 2008/0070745 A1* | 3/2008 | Ogata | B60K 6/48 477/15 |
| 2008/0129049 A1 | 6/2008 | Sauvlet et al. | |
| 2008/0269955 A1* | 10/2008 | Yasui | F01N 9/00 700/299 |
| 2009/0143188 A1* | 6/2009 | Soliman | B60K 6/485 477/5 |
| 2009/0156355 A1* | 6/2009 | Shin et al. | B60K 6/48 477/5 |
| 2009/0253552 A1* | 10/2009 | Foster | B60K 6/445 477/130 |
| 2010/0023193 A1* | 1/2010 | Ebuchi et al. | 701/22 |
| 2010/0038158 A1* | 2/2010 | Whitney et al. | 180/65.265 |
| 2010/0063662 A1 | 3/2010 | Harada et al. | |
| 2010/0070123 A1 | 3/2010 | Itoh et al. | |
| 2011/0287889 A1* | 11/2011 | Eisele et al. | 477/5 |
| 2013/0310219 A1* | 11/2013 | Whitney | B60W 10/11 477/109 |
| 2013/0311055 A1* | 11/2013 | Whitney | B60W 30/18027 701/54 |
| 2015/0292601 A1* | 10/2015 | Tesar | F16D 13/26 475/149 |

FOREIGN PATENT DOCUMENTS

| | | | |
|---|---|---|---|
| CN | 1927611 B * | 8/2011 | |
| DE | 102007050230 A1 | 4/2009 | |
| DE | 102009000706 A1 | 8/2010 | |
| DE | 102006060402 * | 10/2014 | B60K 6/365 |
| EP | 0 281 849 A2 | 2/1988 | |
| EP | 0916547 A2 | 5/1999 | |
| EP | 0 922 600 A2 | 6/1999 | |
| EP | 0922600 A2 | 6/1999 | |
| EP | 1925521 A2 | 5/2008 | |
| EP | 1975028 A2 | 10/2008 | |
| EP | 2141056 A1 | 1/2010 | |
| EP | 1762417 B1 * | 10/2012 | |
| FR | 2882698 A1 | 9/2006 | |
| GB | 2 389 428 A | 12/2003 | |
| GB | 2453415 B * | 11/2012 | B60K 6/48 |
| JP | H07-103041 A | 4/1995 | |
| JP | 2000-032607 A | 1/2000 | |
| JP | 2001-057706 | 2/2001 | |
| JP | 2010-274875 | 12/2010 | |
| WO | WO 9601193 A1 * | 1/1996 | B60K 23/04 |

OTHER PUBLICATIONS

Torque Coordination Control During Mode Transition for a Series-Parallel Hybrid Electric Vehicle; Li Chen ; Gang Xi ; Jing Sun Vehicular Technology, IEEE Transactions on; vol. 61 , Issue: 7; DOI: 10.1109/TVT.2012.2200305; Publication Year: 2012 , pp. 2936-2949.*
Test bench for converters reliability studies for EV and HEV electrical vehicle applications; Bendjedia, M. ; Berthon, A. ; Gustin, F. ; Morelle, J.M. ; Coquery, G.; Power Electronics and Applications, 2009. EPE '09. 13th European Conference on Publication Year: 2009 , pp. 1-13.*
Stability Investigation of an Idle Speed Control Loop for a Hybrid Electric Vehicle; Kandler, C. ; Koenings, T. ; Ding, S.X. ; Weinhold, N. ; Schultalbers, M.; Control Systems Technology, IEEE Transactions on; vol. PP , Issue: 99 DOI: 10.1109/TCST.2014.2358847; Publication Year: 2014 , pp. 1.*
Torque coordination of clutch, engine and motor during power transition for a hybrid electric bus; Chen, L. ; Xi, G.; Vehicle Power and Propulsion Conference (VPPC), 2010 IEEE; DOI: 10.1109/VPPC.2010.5729114; Publication Year: 2010 , pp. 1-6.*
An H-infinity feedback control approach for three-phase voltage source converters; Rigatos, G.; Siano, P.; Cecati, C.; Industrial Electronics Society, IECON 2014—40th Annual Conference of the IEEE; Year: 2014; pp. 1227-1232, DOI: 10.1109/IECON.2014.7048659.*
Modified stator flux estimation based direct torque controlled PMSM drive for hybrid electric vehicle; Choudhury, A.; Pillay, P.; Williamson, S.S.; IECON 2012—38th Annual Conference on IEEE Industrial Electronics Society; Year: 2012 pp. 2965-2970, DOI: 10.1109/IECON.2012.6389425.*
High torque density design of a new outer-rotor hybrid excitation flux switching machine for in-wheel drive electric vehicle Ahmad,

(56) References Cited

OTHER PUBLICATIONS

M.; Sulaiman, E.; Magnetics Conference (INTERMAG), 2015 IEEE; Year: 2015; pp. 1-1, DOI: 10.1109/INTMAG.2015.7156550.*
Torque density improvement of transverse-flux dual rotor machine for power-split hybrid electric vehicle application; Ping Zheng; Quanbin Zhao; Jingang Bai; Bin Yu; Zhiyi Song; Jing Shang; Electrical Machines and Systems (ICEMS), 2014 17th International Conference on; Year: 2014; pp. 1178-1182, DOI: 10.1109/ICEMS.2014.7013666.*
Integrated starter-alternator control system for automotive; Andreescu, G.-D.; Coman, C.-E.; Computational Intelligence and Informatics (CINTI), 2013 IEEE 14th International Symposium on; Year: 2013; pp. 339-343, DOI: 10.1109/CINTI.2013.6705217.*
Electrification of turbocharger and supercharger for downsized internal combustion engines and hybrid electric vehicles-benefits and challenges; Woongkul Lee; Erik Schubert; Yingjie Li; Silong Li; Dheeraj Bobba; Bulent Sarlioglu; 2016 IEEE Transportation Electrification Conference and Expo (ITEC); Year: 2016; pp. 1-6, DOI: 10.1109/ITEC.2016.75.*
Integrated starter-alternator control system for automotive; Gheorghe-Daniel Andreescu; Cristina-Elena Coman; Computational Intelligence and Informatics (CINTI), 2013 IEEE 14th International Symposium on; Year: 2013; pp. 339-343, DOI: 10.1109/CINTI.2013.6705217.*
Symbolic techniques for model-based design of hybrid electric vehicles; Thanh-Son Dao; Johannes Friebe; Electric Drives Production Conference (EDPC), 2012 2nd International; Year: 2012; pp. 1-10, DOI: 10.1109/EDPC.2012.6425106.*
HEV diffusion forecast by key device analysis; Namio Yamaguchi; Shigeyuki Minami; Electric Vehicle Symposium and Exhibition (EVS27), 2013 World; Year: 2013; pp. 1-7, DOI: 10.1109/EVS.2013.6914724.*
International Search Report for PCT Application No. PCT/EP2012/051486 dated Jul. 4, 2012; 3 pages.
International Search Report dated Jul. 5, 2012, International Application No. PCT/EP2011/074043; 5 pages.
International Search Report for PCT Application No. PCT/EP2012/051485 dated Jul. 2, 2012; 4 pages.
International Search Report for PCT Application No. PCT/EP2012/051487 dated Jul. 10, 2012; 4 pages.
International Search Report for PCT Application No. PCT/EP2012/051488 mailed Oct. 10, 2012; 6 pages.
Written Opinion for PCT Application No. PCT/EP2011/074043 mailed Jun. 23, 2013; 6 pages.
Dextreit, Clement; "Hybrid Electric Vehicle Controller and Mehtod of Controlling a Hybrid Electric Vehicle"; U.S. Appl. No. 13/983,230, filed Aug. 1, 2013; 42 pages.
Hancock et al., Matthew; "Hybrid Electric Vehicle and Method of Controlling a Hybrid Electric Vehicle"; U.S. Appl. No. 13/983,238, filed Aug. 1, 2013; 19 pages.
Hancock et al , Matthew; "Hybrid Electric Vehicle Controller and Method of Controlling a Hybrid Electric Vehicle"; U.S. Appl. No. 13/983,239, filed Aug. 1, 2013; 36 pages.
Laing, Philippa; "Hybrid Electric Vehicle Controller and Method of Controlling a Hybrid Electric Vehicle"; U.S. Appl. No. 13/997,528, filed Jun. 24, 2013; 19 pages.
Notification of the First Office Action, Chinese Patent Application No. 201280015448.X, Aug. 28, 2015, 18 pages.

* cited by examiner

HYBRID ELECTRIC VEHICLE CONTROLLER AND METHOD OF CONTROLLING A HYBRID ELECTRIC VEHICLE

CROSS REFERENCE TO RELATED APPLICATIONS

This application is a National Phase Application of Patent Application PCT/EO2012/051486 filed on 31 Jan. 2012, which claims priority of GB1101704.3, filed 1 Feb. 2011, of which both applications are incorporated by reference herein in their entirety.

FIELD OF THE INVENTION

The present invention relates to a controller for a hybrid electric vehicle (HEV), a HEV and a method of controlling a HEV. In particular but not exclusively the invention relates to a controller and a method of controlling a parallel-type HEV during a transition from an electric vehicle (EV) mode of operation to a parallel mode.

BACKGROUND

It is known to provide a hybrid electric vehicle (HEV) having an electric machine and an internal combustion engine (ICE) connected in parallel to a driveline of the vehicle.

The vehicle may be operated in an electric vehicle (EV) mode in which torque to the driveline is provided exclusively by the electric machine. Alternatively the vehicle may be operated in a parallel mode in which torque is provided to the driveline by the ICE and electric machine.

It is desirable to provide a HEV having improved noise, vibration and harshness (NVH) performance in respect of the transition from the EV mode to the parallel mode of operation. It is further desirable to provide a HEV operable to transition from the EV mode to the parallel mode in a reduced time period.

STATEMENT OF THE INVENTION

Embodiments of the invention may be understood by reference to the appended claims.

Aspects of the invention provide motor vehicle brake control means, a motor vehicle and a method.

In a further aspect of the invention for which protection is sought there is provided a controller for a hybrid electric vehicle having a first actuator and at least a second actuator operable to drive a driveline of the vehicle, the vehicle having releasable torque transmitting means operable releasably to couple the first actuator to the driveline, the releasable torque transmitting means being operable between a first condition in which the first actuator is substantially disconnected from the driveline and a second condition in which the first actuator is substantially connected to the driveline, the controller being operable to control the vehicle to transition between a first mode in which the releasable torque transmitting means is in the first condition and a second mode in which the releasable torque transmitting means is in the second condition, when a transition from the first mode to the second mode is required the controller being arranged to provide a control signal to the first actuator to control the speed thereof, the control signal being responsive to the speed of the first actuator and the amount of torque transfer provided by the releasable torque transmitting means.

It is to be understood that as the releasable torque transmitting means transitions from the first state to the second state the amount of torque developed by the first actuator that may be transmitted across the torque transmitting means increases.

In the case where the releasable torque transmitting means is in the form of a multiplate wet clutch, the torque transmitting capacity of the clutch (or 'clutch capacity') is typically dependent on the amount of hydraulic pressure ('clutch pressure') applied to the plates of the clutch. The clutch capacity typically increases linearly with clutch pressure. As the clutch transitions from fully open (substantially no clutch pressure and therefore substantially no torque transferred thereacross) to fully closed (maximum clutch pressure), the torque capacity increases from substantially zero to the maximum value. The maximum value may for example be 600 Nm.

If an engine is producing 100 Nm of torque, substantially all of this torque will be transmitted by the clutch as soon as the clutch capacity reaches 100 Nm. That is, as soon as the clutch pressure is sufficiently high to permit 100 Nm of torque to be transmitted by the clutch.

It is to be understood that an effective moment of inertia of the first actuator will change as the torque transmitting means transitions between the first and second states.

Prior art engine speed controllers have the feature that feedback control parameters of the controller are optimised for 'no-load' conditions of the engine, i.e. conditions in which the engine is not coupled to a load such as a vehicle driveline. An engine speed controller may for example be used to hold an engine at a steady idle speed when the engine is not connected to the driveline and an accelerator control such as an accelerator pedal is not depressed.

If the engine speed is controlled by the engine speed controller to maintain a given value as the releasable torque transmitting means is closed, the feedback control parameters will therefore be sub-optimum as soon as the releasable torque transmitting means begins to close and the engine is placed under load. Embodiments of the present invention have the advantage that as the amount of torque transfer provided by the releasable torque transmitting means increases, thereby placing the first actuator (e.g. an engine) under load, the controller is configured to provide a control signal to the first actuator that is responsive to the amount of torque transfer as well as the speed of the first actuator. Thus the feedback control signal takes into account the first actuator loading and controls the first actuator to maintain or attain a target speed.

This allows the controller to adapt the control signals it provides to the changing effective moment of inertia of the first actuator. This allows an improvement in driveability of the vehicle to be obtained; that is, smoother and more rapid transitions between the first and second modes are facilitated.

It is to be understood that embodiments of the invention allow an improvement in noise, vibration and harshness (NVH) performance of the vehicle and/or a more rapid change in the amount of torque transfer provided by the releasable torque transmitting means for a given NVH performance. This in turn allows a more rapid transition between the EV and parallel modes to be achieved.

It is to be understood that improved (or increased) NVH performance corresponds to a decrease in noise, vibration and/or harshness experienced by an occupant of the vehicle.

It is to be understood that in some embodiments of the invention a smoother and/or or faster transition from EV to parallel mode may be enjoyed for a given level of NVH performance.

The controller may be operable to control the releasable torque transmitting means gradually to change the amount of torque transfer provided thereby.

In an embodiment the control signal is responsive to an increase in effective moment of inertia of the first actuator as the amount of torque transfer provided by the torque transmitting means increases.

It is to be understood that when the releasable torque transmitting means begins to transition between the first and second conditions, the amount of torque input to the releasable torque transmitting means will typically be greater than the torque transmitting capacity thereof, at least in the initial stages of the transition. Accordingly, the amount of torque actually transmitted by the releasable torque transmitting means (corresponding to the torque loading on the first actuator) will correspond to the torque capacity of the releasable torque transmitting means. In the case of a multiplate wet clutch this will in turn corresponds to the clutch pressure.

It is to be understood that the controller may therefore control the speed of the first actuator using one or more feedback (and/or feedforward) parameters the value(s) of which are dependent on the torque capacity. In order to accomplish this in a practical system in a relatively straightforward manner the controller may refer to a parameter associated with torque capacity in order to determine torque capacity, such as a hydraulic fluid pressure or actuator current associated with the releasable torque transmitting means, such as a clutch actuator current.

In an embodiment the control signal is further responsive to a temperature of the first actuator.

This feature has the advantage that changes in temperature of the first actuator which may in turn result in changes in the effective moment of inertia of the first actuator may be anticipated by the controller and the first actuator controlled in order more effectively to control the engine speed.

The controller may be arranged to be responsive to a change in rotational energy losses of the first actuator as the temperature of the first actuator increases and a corresponding change as the temperature of the first actuator decreases.

This has the advantage that if (say) a viscosity of lubricant of the first actuator changes as the first actuator increases in temperature, the controller is able to control the engine in a manner corresponding to the changed characteristics of the actuator.

Similarly, if (say) the effective moment of inertia changes due to thermal expansion or contraction the controller is able to anticipate this and control the first actuator accordingly. It is to be understood that the effective moment of inertia may increase (or decrease) and then decrease (or increase) as temperature rises from a given ambient temperature.

The control signal may be further responsive to a value of driver demanded torque $TQ_d$ being a torque demanded of the vehicle by the driver.

This feature has the advantage that the speed of the first actuator may be controlled according to an instantaneous value of driver demanded torque in order more effectively to meet a driver's torque requirement in a given situation.

For example, if the value of driver demanded torque is relatively high the controller may control the speed of the first actuator in such a manner more quickly to achieve the target engine speed even if a reduction in NVH performance results.

Similarly, if the value of driver demanded torque is relatively low the controller may control the speed of the first actuator in such a manner that the target engine speed is obtained more slowly but with a corresponding improvement in NVH performance.

The controller may be configured to determine the control signal according to a proportional-integral-derivative (PID) control methodology.

The controller may be configured to determine at least one of a proportional feedback parameter, an integral feedback parameter and a derivative feedback parameter of the PID control methodology in dependence on the amount of torque transfer provided by the releasable torque transmitting means.

The controller may be configured to determine at least one of a proportional feedback parameter, an integral feedback parameter and a derivative feedback parameter of the PID control methodology in dependence on at least one of a temperature of the first actuator and a value of driver demanded torque $TQ_d$.

The controller may be configured to determine a feedforward parameter in dependence on at least one of a temperature of the first actuator and a value of driver demanded torque $TQ_d$.

This has the advantage that a speed of response of the controller may be improved since the controller is able to react faster than the feedback terms allow.

Alternatively or in addition the controller may be configured to determine the control signal according to a H-infinity control methodology.

In some embodiments different sets of H-infinity control coefficients may be used for the H-infinity control methodology depending on a state of the releasable torque transmitting means.

Thus if the releasable torque transmitting means is arranged to transmit no torque from the first actuator to the driveline a first set of coefficients may be employed.

If the releasable torque transmitting means is arranged to transmit a partial torque then a further set of coefficients may be employed depending on the proportion of the torque developed by the first actuator that is transmitted to the driveline.

If the releasable torque transmitting means is arranged to transmit substantially the full amount of torque from the first actuator to the driveline then a still further set of coefficients may be employed.

In some embodiments the sets of coefficients may be chosen in dependence on the magnitude of the actual torque transmitted. Thus, one set of coefficients may be used when a first value of torque is to be transmitted (such as up to 100 Nm of torque), a further set of coefficients may be used when a second value of torque is to be transmitted (such as from 100 Nm to 200 Nm of torque) and so forth.

In some embodiments the different sets of coefficients may be implemented by respective different H-infinity controllers.

In some such embodiments an auxiliary controller may be employed to blend outputs of the individual H-infinity controllers as the amount of torque transmitted by the releasable torque transmitting means changes, e.g. from 0 Nm to 400 Nm.

In the case that the releasable torque transmitting means comprises a clutch, the outputs may thus be blended as clutch engagement progresses.

In a further aspect of the invention for which protection is sought there is provided a hybrid electric vehicle comprising: a controller according to the first aspect; a first actuator and at least a second actuator operable to drive a driveline of the vehicle, the at least a second actuator comprising an electric machine; and releasable torque transmitting means operable releasably to couple the first actuator to the driveline, the releasable torque transmitting means being operable between the first condition in which the first actuator is substantially disconnected from the driveline and the second condition in which the first actuator is substantially connected to the driveline such that substantially all of the torque generated by the first actuator is transmitted to the driveline, the controller being operable to control the vehicle to transition between the first mode in which the releasable torque transmitting means is in the first condition and the second mode in which the releasable torque transmitting means is in the second condition.

The releasable torque transmitting means may comprise an input portion and an output portion, the input portion being coupled to the first actuator and the output portion being coupled to the driveline.

The output portion may be coupled to the driveline via a transmission.

Reference to a transmission is intended to include manual transmissions, automatic transmissions, transmissions having a set of discrete, selectable gear ratios and transmissions having continuously variable gear ratios such as transmissions of the CVT (continuously variable transmission) type.

The output portion may be coupled to the driveline via the at least a second actuator.

The output portion may be coupled to the transmission via the at least a second actuator.

In an embodiment the controller is operable to control the vehicle to transition from the first mode to the second mode by controlling the speed of rotation of the first actuator to achieve a target speed and controlling the releasable torque transmitting means to transition from the first condition to the second condition.

The target speed of rotation may be substantially equal to that of the output portion of the releasable torque transmitting means.

In an embodiment the target speed of rotation is greater than that of the output portion of the releasable torque transmitting means.

Optionally the target speed of rotation is greater than that of the output portion of the releasable torque transmitting means by an amount responsive to at least one selected from amongst a value of driver demanded torque, a speed of rotation of the output portion of the releasable torque transmitting means and a selected gear ratio between the first actuator and one or more wheels of the vehicle.

Alternatively the target speed of rotation may be greater than that of the output portion of the releasable torque transmitting means by an amount in the range of one selected from amongst from 0 to 1000 revolutions per minute (rpm), from 10 to 1000 rpm, from 0 to 500 rpm and from 10 to 500 rpm.

The releasable torque transmitting means may comprise clutch means.

In an embodiment the first actuator comprises an internal combustion engine.

In an embodiment the electric machine is operable as a motor/generator.

In an embodiment the control signal is responsive to the speed of the first actuator and the amount of torque transfer provided by the releasable torque transmitting means, the amount of torque transfer being the proportion of the torque applied by the first actuator to the releasable torque transmitting means that is transmitted to the driveline.

Alternatively or in addition the control signal may be responsive to the speed of the first actuator and the amount of torque transfer provided by the releasable torque transmitting means, the amount of torque transfer being the magnitude of the torque transmitted by the releasable torque transmitting means to the driveline.

In an embodiment the releasable torque transmitting means comprises a clutch device operable between a first, open condition and a second, closed condition responsive to a clutch device pressure value being a value of pressure applied to releasable torque transmitting components of the device thereby to enable torque to be transmitted therebetween, wherein the amount of torque transfer provided by the device is determined by the controller to correspond to the clutch device pressure value.

Thus the controller may determine the amount of torque transfer provided by the clutch device by reference to the clutch device pressure value.

Optionally the clutch device is a hydraulically actuated clutch device and the clutch device pressure value is determined by the controller to correspond to a pressure of hydraulic fluid applied to the releasable torque transmitting components.

Thus the controller may determine the amount of torque transfer by reference to a clutch device hydraulic pressure value. The controller may consult a look-up table or other data store to determine the maximum torque that may be transmitted by the clutch device at a given value of hydraulic fluid pressure. The controller may assume that the maximum amount of torque that may be transmitted by the clutch device at the current value of hydraulic fluid pressure corresponds to the actual amount of torque being transmitted by the clutch device at a given moment in time, which in turn corresponds to the torque loading on the engine.

As discussed above, this assumption is reasonable during at least the initial stages of clutch closure where the amount of torque developed by the engine is greater than that which may be transmitted by the clutch means. In some embodiments engine speed control is particularly important during the initial stages of clutch closure.

Alternatively the clutch device may be an electrically actuated clutch device and the clutch pressure is determined by the controller to correspond to a pressure applied to the releasable torque transmitting components by an electrical actuator.

In an embodiment the pressure applied by the electrical actuator is determined in dependence on a value of electrical drive current provided to the actuator.

In one aspect of the invention for which protection is sought there is provided a method of controlling a hybrid vehicle during a transition from a first mode in which at least a second actuator is coupled to the driveline and a first actuator is decoupled from the driveline by means of a releasable torque transmitting means to a second mode in which the first actuator is coupled to the driveline by means of the torque transmitting means, the method comprising providing a control signal to the first actuator to control the speed thereof, the control signal being responsive to the speed of the first actuator and the amount of torque transfer provided by the releasable torque transmitting means.

In an embodiment the step of providing the control signal responsive to the speed of the first actuator and the amount of torque transfer provided by the releasable torque transmitting means is performed when it is required to connect the first actuator to the driveline by means of the releasable torque transmitting means.

In another aspect of the invention for which protection is sought there is provided a method of controlling a hybrid electric vehicle during a transition from a first mode in which at least a second actuator is coupled to a driveline and a first actuator is decoupled from the driveline by means of a releasable torque transmitting means to a second mode in which the first actuator is coupled to the driveline by means of the releasable torque transmitting means, the method comprising providing a control signal to the first actuator to control the speed thereof, the control signal being responsive to the speed of the first actuator and the amount of torque transfer provided by the releasable torque transmitting means.

In a further aspect of the invention for which protection is sought there is provided a controller for a hybrid electric vehicle having a first actuator and at least a second actuator operable to drive a driveline of the vehicle, the vehicle having releasable torque transmitting means having an input shaft coupled to the first actuator and an output shaft coupled to the driveline, the controller being operable to control the releasable torque transmitting means to transition between first and second states, in the first state the releasable torque transmitting means being arranged substantially to isolate the input shaft from the output shaft and in the second state the releasable torque transmitting means being arranged substantially to connect the input shaft to the output shaft, the controller being operable to control the vehicle to transition from a first mode in which the first actuator is disconnected from the driveline to a second mode in which the first actuator is connected to the driveline, when a transition from the first mode to the second mode is required the controller being arranged to control the speed of rotation of the first actuator to reach a target speed of rotation and to control the releasable torque transmitting means to transition between the first and second states, wherein the controller is arranged to provide a control signal to the first actuator to control the speed thereof, the control signal being responsive to the speed of the first actuator and the amount of torque transmitted between the input and output shafts of the releasable torque transmitting means as it transitions from the first state to the second state.

BRIEF DESCRIPTION OF THE DRAWINGS

Embodiments of the invention will now be described with reference to the accompanying figures in which.

DETAILED DESCRIPTION

Figure 1:
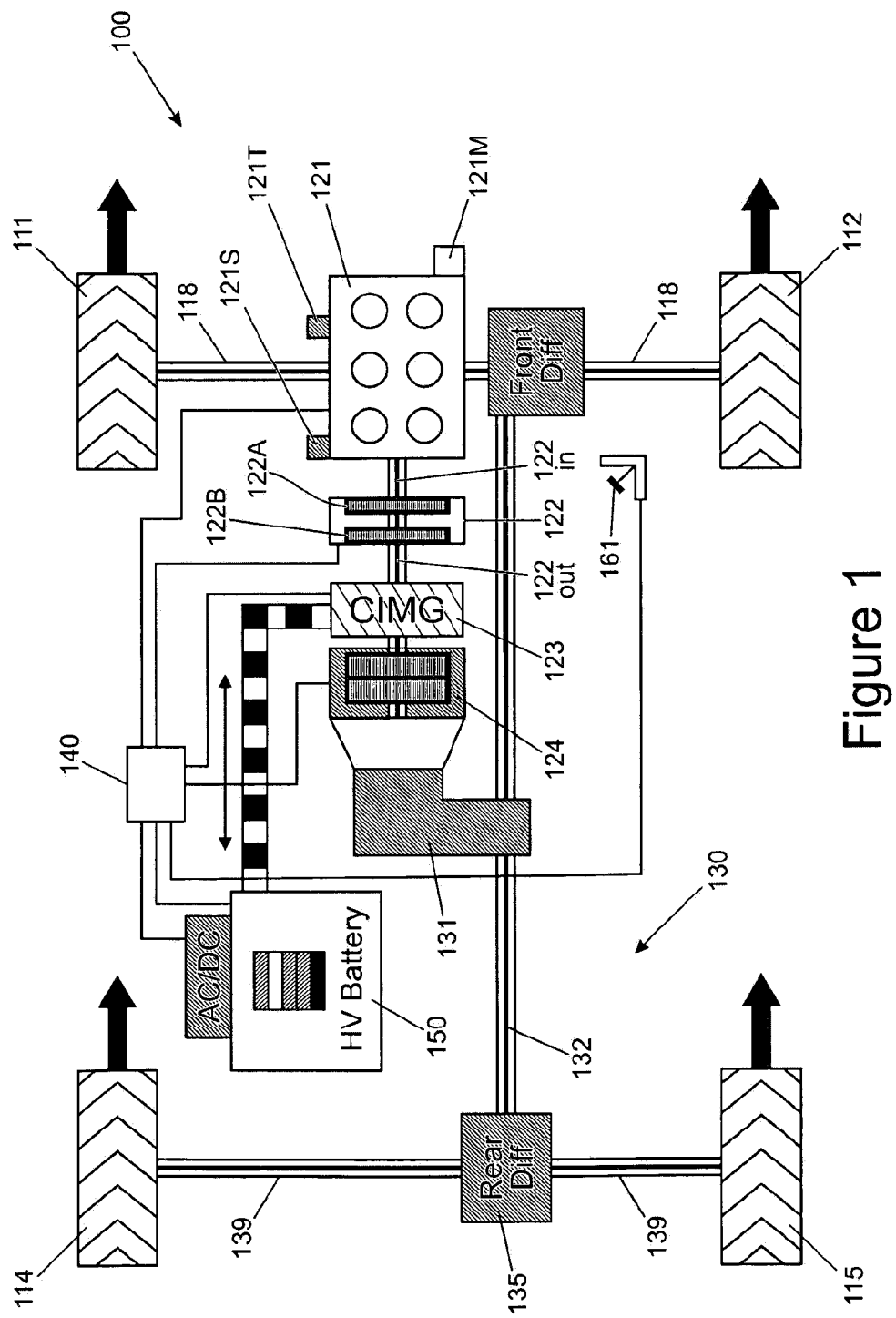
FIG. 1 is a schematic illustration of a hybrid electric vehicle according to an embodiment of the present invention.

FIG. 1 shows a hybrid electric vehicle (HEV) 100 according to an embodiment of the present invention. The HEV 100 has an internal combustion engine 121 releasably coupled to a crankshaft integrated motor/generator (CIMG) 123 by means of a clutch 122. The clutch 122 has an input shaft 122IN coupled to a crankshaft of the engine and arranged to rotate therewith. The clutch 122 also has an output shaft 122OUT coupled to the CIMG 123 and arranged to rotate therewith.

The clutch 122 has a pair of plates 122A, 122B that are fixedly coupled to the input shaft 122IN and output shaft 122OUT respectively.

The clutch 122 is operable to transition between an open condition and a closed condition. In the open condition the plates 122A, 122B are separated from one another such that substantially no torque is transferred from the input shaft 122IN to the output shaft 122OUT. In the closed condition the plates 122A, 122B are urged together such that torque applied to the input shaft 122IN by the engine 121 is transferred substantially directly to the output shaft 122OUT.

The clutch 122 is operable to move the plates 122A, 122B towards one another as the clutch 122 transitions from the open condition to the closed condition whereby the amount of torque transferred from the input shaft 122IN to the output shaft 122OUT may be increased in a controlled manner.

Similarly, the clutch 122 is operable to move the plates 122A, 122B away from one another as the clutch transitions from the closed condition to the open condition.

The CIMG 123 is in turn coupled to an automatic transmission 124. The transmission 124 is arranged to drive a pair of front wheels 111, 112 of the vehicle 100 by means of a pair of front drive shafts 118. The transmission 124 is also arranged to drive a pair of rear wheels 114, 115 by means of an auxiliary driveline 130 having an auxiliary driveshaft 132, a rear differential 135 and a pair of rear driveshafts 139.

A battery 150 is provided that may be coupled to the CIMG 123 in order to power the CIMG 123 when it is operated as a motor. Alternatively the battery 150 may be coupled to the CIMG 123 to receive charge when the CIMG 123 is operated as a generator, thereby to recharge the battery 150.

The vehicle 100 is configured to operate in either one of a parallel mode and an electric vehicle (EV) mode.

In the parallel mode of operation the clutch 122 is closed and the engine 121 is arranged to provide torque to the transmission 124. In this mode the CIMG 123 may be operated either as a motor or as a generator.

In the EV mode of operation the clutch 122 is opened and the engine 121 is turned off. Again, the CIMG 123 is then operated either as a motor or as a generator. It is to be understood that the CIMG 123 may be arranged to act as a generator in EV mode in order to effect regenerative braking of the vehicle.

The vehicle 100 has a controller 140 arranged to control the vehicle 100 to transition between the parallel and EV modes when required.

When a transition from EV mode to parallel mode is required the controller 140 is configured to start the engine 121 by means of a starter motor 121M and to control the speed of the engine 121 to achieve a target engine speed $w_{eT}(t)$ In the present embodiment $w_{eT}(t)$ corresponds to that of the output shaft 122OUT of the clutch 122 which is also the speed of the CIMG 123, $w_c$.

The controller 140 controls the speed of the engine 121 by reference to an output of an engine speed sensor 121S that provides an output corresponding to a speed of the engine 121.

In the embodiment of FIG. 1 the controller 140 controls the engine 121 to achieve a required engine speed by modulating the amount of torque that the controller 140 demands the engine 121 to provide.

The controller 140 is arranged to employ a closed loop feedback control methodology in order to modulate the torque demanded from the engine 121. Thus the controller 140 is provided with an input signal from the engine speed measurement device 121S corresponding to the actual engine speed $w_e(t)$ at a given time t. The controller 140 uses the signal from the speed measurement device 121S to calculate an engine speed error e(t) which corresponds to a difference between the actual engine speed $w_e(t)$ and the target engine speed $w_{eT}(t)$.

It is to be understood that it is desirable that the controller 140 controls the engine 140 to achieve $w_{eT}(t)$ as quickly as possible and in a manner such that minimal overshoot of the target speed $w_{eT}(t)$ occurs. Furthermore it is desirable that minimal oscillation of the engine speed occurs about $w_{eT}(t)$.

As well as controlling the engine to start and to achieve the target engine speed $w_{eT}(t)$ the controller 140 is configured gradually to close the clutch 122 to connect the engine 121 to the CIMG 123. It is to be understood that the controller 140 is configured to maintain $w_e$ at the target engine speed $w_{eT}(t)$ as the clutch 122 is gradually closed.

In the embodiment of FIG. 1 the closed loop feedback control methodology employed is a proportional-integral-differential (PID) control methodology. Thus the controller 140 is arranged to calculate a set of three feedback parameters responsive to the engine speed error e(t) and to determine a value of torque $TQ_e$ to be demanded from the engine 121 responsive to a sum of the three feedback parameters.

Figure 2:
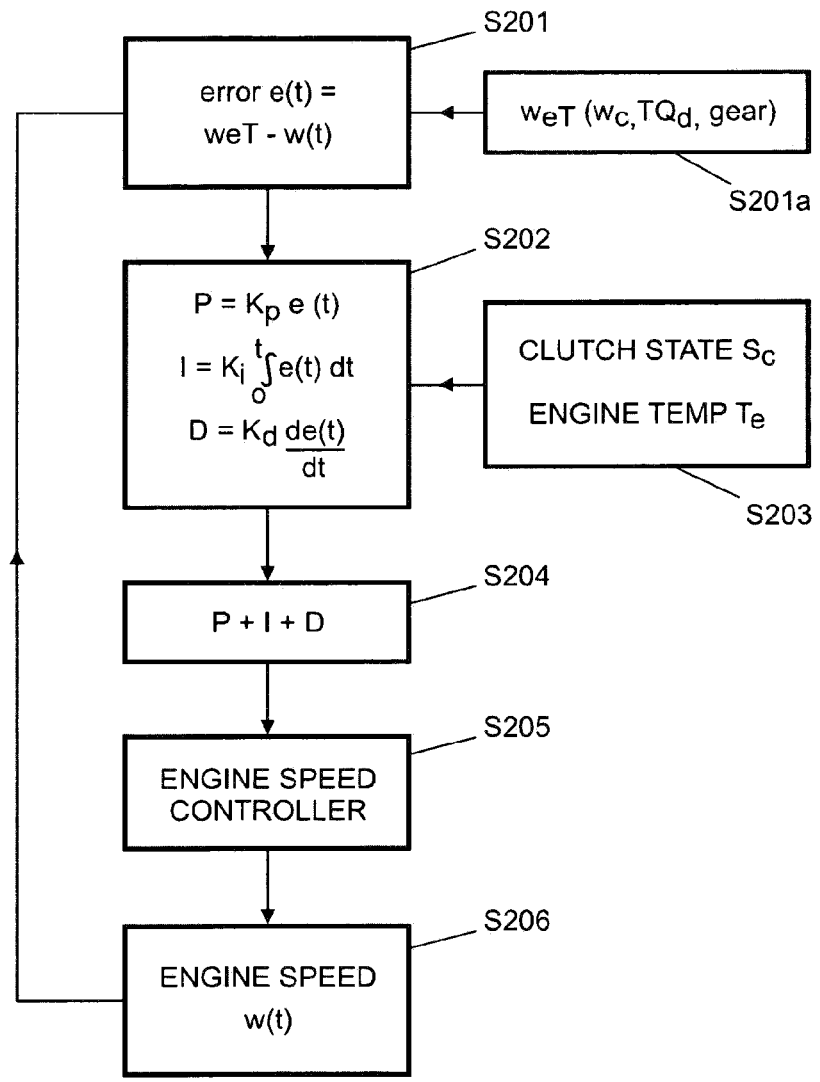
FIG. 2 is a flow chart illustrating a control methodology according to an embodiment of the invention.

FIG. 2 is a schematic illustration of one embodiment of a PID feedback control methodology being the methodology implemented by the controller 140. Whilst the methodology will be described by reference to a series of steps, it is to be understood that the steps need not necessarily be performed in the order in which they are described. Thus, some of the steps may be performed in parallel as might be expected for example in an analogue implementation.

At step S201 an error speed e(t) is calculated being a difference between the target engine speed $w_{eT}(t)$ and a current value of engine speed $w_e(t)$ as discussed above.

The target engine speed $w_{eT}(t)$ is itself dependent on the speed of the CIMG 123, the value of driver demanded torque $TQ_d(t)$ and a selected gear of the transmission 124.

Thus, at step S201a the value of $w_{eT}(t)$ is calculated for use in step S201.

At step S202 the error speed e(t) is used to calculate three feedback parameters. The first feedback parameter is a proportional feedback parameter P being a parameter responsive to the current value of e(t):

$$P = K_p e(t) \quad (1)$$

where $K_p$ is a function responsive to the current state of the clutch 122 $S_c(t)$, current temperature of the engine $T_e(t)$ and driver demanded torque $TQ_d(t)$.

In the present embodiment, by current state of the clutch 122 $S_c(t)$ is meant the magnitude of the instantaneous torque transmitted by the clutch 122 from the input shaft 122IN to the output shaft 122OUT thereof. In some embodiments the value of instantaneous torque is assumed to be equal to a torque transmitting capacity (torque capacity) of the clutch at a given moment in time. The torque capacity may be dependent on an amount of pressure applied to close the clutch, such as a hydraulic pressure or electrical actuator pressure, to close the clutch. In some alternative embodiments $S_c(t)$ may refer to a proportion (such as a percentage) of the torque applied to the input portion of the clutch 122 that is transmitted to the output portion.

The proportional feedback parameter may also be referred to as a torque contribution that is proportional to the error speed e(t) through the parameter $K_p$.

The second is an integral feedback parameter I being a parameter proportional to the sum of recent values of e(t):

$$I = K_i \int_0^t e(t) \, dt \quad (2)$$

where $K_i$ is also a function responsive to $S_c(t)$, $T_e(t)$ and $TQ_d(t)$.

The integral feedback parameter may also be referred to as a torque contribution that is proportional to the integral of the error speed e(t) through the parameter $K_i$.

The third is a differential feedback parameter D being a parameter proportional to the rate at which e(t) has been changing:

$$D = K_d \frac{de(t)}{dt} \quad (3)$$

where $K_d$ is a further function responsive to $S_c(t)$, $T_e(t)$ and $TQ_d(t)$.

The differential feedback parameter may also be referred to as a torque contribution that is proportional to the derivative of the error speed e(t) through the parameter $K_d$.

At step 204 the values of the three feedback parameters P, I, D are summed together to provide a sum $\Sigma$:

$$\Sigma = P + I + D \quad (4)$$

The value of $\Sigma$ is provided to an engine speed control (ESC) portion of the controller 140. At step S205 the engine speed control portion controls the speed of the engine 121 responsive to the value of $\Sigma$.

At step S206 the engine speed $w_e(t)$ is again measured using engine speed sensor 121S and the control process continues at step S201.

It is to be understood that because the feedback parameters P, I and D are responsive to $S_c(t)$, $T_e(t)$, $TQ_d(t)$ the feedback provided to control the torque output of the engine 121 may be arranged to change as the clutch 122 closes, as engine temperature $T_e$ changes and as driver demanded torque $TQ_d$ changes.

Arranging for the feedback parameters P, I, D to be responsive to $S_c(t)$ and $T_e(t)$ is advantageous because as the clutch 122 closes and/or engine temperature changes the response of the engine 121 to a given torque demand control input from the controller 140 changes. The controller 140 anticipates this change and changes the feedback parameters P, I, D accordingly in order to control engine speed $w_e(t)$ in a more precise manner. This allows a reduction in the time required for a transition from EV to parallel mode for a given level of vehicle NVH.

Thus the controller 140 anticipates that the engine 121 will respond relatively quickly to changes in values of torque demanded by the controller 140 as the engine speed increases initially from zero prior to closure of the clutch 122, but will respond increasingly slowly to changes in value of torque demanded by the controller 140 once the clutch 122 begins to close.

Furthermore, arranging for the feedback parameters P, I, D to be responsive to $TQ_d(t)$ has the advantage that if driver demanded torque is relatively low the controller 140 may control the engine 121 to spin up to the target speed $w_{eT}(t)$ at a slower rate thereby reducing an amount of undesirable combustion gases emitted by the engine 121.

If on the other hand driver demanded torque $TQ_d$ is relatively high the controller 140 may control the engine to spin up to the target engine speed $w_{eT}(t)$ at a higher rate. This is so that if the vehicle is unable to meet the value of $TQ_d$ by means of the CIMG 123 alone, a delay in meeting $TQ_d$ is reduced since connection of the engine 121 to the transmission 124 will occur sooner if the engine is spun up to the target speed more quickly.

Other arrangements are also useful. For example, different control methodologies may be employed. Thus in some embodiments a H-infinity or other feedback control methodology may be employed.

It is to be understood that in the embodiment of FIG. 1 once the clutch 122 is closed the controller 140 no longer controls the engine 121 so as to achieve a given target speed. Rather the controller controls the engine 121 to deliver a target torque $TQ_T$.

In some embodiments of the invention the target engine speed $w_{eT}(t)$ is greater than that of the output shaft of the clutch 122OUT. In some embodiments this has the advantage that the speed of the engine $w_e$ attains the speed of the output shaft 122OUT more quickly as it is increased towards the target speed. Furthermore, in some such embodiments (in which $w_{eT}(t)$ is greater than the speed of the output shaft 122OUT) the controller 140 is configured to control the clutch 122 to close as the value of $w_e$ becomes equal to the speed of the output shaft 122OUT, as $w_e$ increases towards $w_{eT}(t)$.

A further advantage of such embodiments is that as the clutch 122 closes and thereby increases a torque load on the engine 121 the controller 140 is required to increase the torque output of the engine 121 $TQ_e$, in order to achieve an engine speed equal to $w_{eT}(t)$.

Thus, at the moment when the clutch 122 is fully closed, $TQ_e$ will be higher for higher values of $w_{eT}(t)$ since the controller 140 is seeking to increase $w_e$ towards $w_{eT}$. This has the advantage that at the moment the clutch 122 is fully closed $TQ_e$ may be closer to a value of $TQ_e$ required by the controller 140 when the vehicle is in the parallel mode.

For example, the controller 140 may be configured to operate the vehicle according to an energy management program (EMP). The EMP may be configured to determine when the vehicle is to operate in EV mode and when the vehicle is to operate in parallel mode. When operating in the parallel mode the EMP may be configured to determine the required torque split between the engine 121 and CIMG 123 in order to optimise vehicle emissions performance (or other performance criteria). For example the EMP may be configured to control the torque split so as to reduce or minimise the amount of carbon dioxide emitted by the vehicle over a given drive cycle.

It is to be understood that by torque split is meant the relative proportion of the driver demanded torque $TQ_d$ that is to be provided by the engine 121 and CIMG 123 respectively.

Some embodiments of the invention have the advantage that relatively fast engine spin up times may be achieved whilst maintaining a stable response by the engine 121 to torque control signals provided to the engine 121 during engagement of the clutch 122.

Some embodiments of the invention allow an engine 121 to provide optimum speed of response to driver torque demand $TQ_d$ when a vehicle transitions from EV to parallel mode. Some embodiments allow relatively stable engine speed control to be achieved during clutch engagement and reduced sensitivity of vehicle performance to engine temperature $T_e$.

Embodiments of the invention have the advantage of providing increased drivability of the vehicle to the driver.

Whilst the above embodiments of the invention are arranged such that the CIMG 123 is coupled directly to an output shaft (or other output means) of the clutch 122, in some embodiments the transmission 124 may be provided between the clutch 122 and an electric machine being the second actuator, for example in a vehicle having an electric rear axle drive (ERAD) unit. In an ERAD unit the electric machine may be provided in a rear differential or other unit so as to provide torque to rear drive shafts of the vehicle. It is to be understood that in such embodiments the speed of rotation of the ERAD unit may not correspond to that of the output shaft of the clutch 122. Thus the target engine speed $w_{eT}(t)$ may be required to be determined based on the speed of the electric machine and a gear ratio between the ERAD and engine 121. The gear ratio may in turn depend on the identity of a gear selected by the transmission 124.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A controller for a hybrid electric vehicle, the vehicle having an internal combustion engine and an electric machine operable to drive a driveline of the vehicle, the vehicle having a clutch that releasably couples the internal combustion engine to the driveline, wherein the clutch comprises an input portion coupled to the engine and an output portion, wherein the clutch is operable between an open condition, in which the internal combustion engine is substantially disconnected from the driveline, and a closed condition, in which the internal combustion engine is substantially connected to the driveline, wherein the controller is configured to:
  control the vehicle to transition between a first mode, in which the clutch is in the open condition, and a second mode, in which the clutch is in the closed condition; and
  provide, when a transition from the first mode to the second mode is required, a control signal to the internal combustion engine to control a speed thereof to achieve a target speed, wherein the target speed is greater than a speed of the output portion of the clutch, and wherein the control signal is responsive to the speed of the internal combustion engine and an amount of torque transfer provided by the clutch.

2. A controller as claimed in claim 1, the controller being operable to control the clutch gradually to change the amount of torque transfer provided thereby.

3. A controller as claimed in claim 1, wherein the control signal is further responsive to a temperature of the internal combustion engine.

4. A controller as claimed in claim 3, wherein the control signal is responsive to the temperature of the internal combustion engine as the temperature increases over a prescribed temperature range.

5. A controller as claimed in claim 1, wherein the control signal is further responsive to a value of driver demanded torque being the value of the torque demanded of the vehicle by the driver.

6. A controller as claimed in claim 1, the controller being configured to determine the control signal according to a proportional-integral-derivative (PID) control methodology.

7. A controller as claimed in claim 6, the controller being further configured to determine at least one of a proportional feedback parameter, an integral feedback parameter and a derivative feedback parameter of the PID control methodology in dependence on the amount of torque transfer provided by the clutch.

8. A controller as claimed in claim 6, the controller being further configured to determine at least one of a proportional feedback parameter, an integral feedback parameter and a derivative feedback parameter of the PID control methodology in dependence on at least one of a temperature of the internal combustion engine and a value of driver demanded torque.

9. A controller as claimed in claim 1, wherein the control signal is further responsive to a feedforward signal.

10. A controller as claimed in claim 9, the controller being configured to determine a feedforward parameter of the feedforward signal in dependence on at least one of the amount of torque transfer provided by the clutch, the speed of the internal combustion engine, a temperature of the internal combustion engine and a value of driver demanded torque.

11. A controller as claimed in claim 1, the controller being configured to determine the control signal according to a H-infinity control methodology.

12. A controller as claimed in claim 11, the controller being further configured to determine the control signal according to a H-infinity control methodology using different H-infinity control coefficients responsive to the amount of torque transfer provided by the clutch.

13. A controller as claimed in claim 12, further comprising a plurality of H-infinity controllers each H-infinity controller having a different set of H-infinity control coefficients, the controller being arranged to select a H-infinity controller responsive to the amount of torque transfer provided by the clutch.

14. A controller as claimed in claim 13, the controller being operable to blend an output of two or more of the H-infinity controllers as the H-infinity controller selected is changed responsive to the amount of torque transfer.

15. A controller as claimed in claim 11, the controller being configured to determine the control signal according to a H-infinity control methodology using different H-infinity control coefficients responsive to at least one of the speed of the internal combustion engine, a temperature of the internal combustion engine and a value of driver demanded torque.

16. A controller as claimed in claim 1, wherein the clutch is operable between the open condition and the closed condition responsive to a clutch pressure value being a value of pressure applied to the clutch, thereby to enable torque to be transmitted therebetween, wherein the amount of torque transfer provided by the clutch is determined by the controller to correspond to the clutch pressure value.

17. A controller as claimed in claim 16, wherein the clutch is hydraulically actuated and the clutch pressure value is determined by the controller so as to correspond to a pressure of hydraulic fluid applied to the clutch.

18. A controller as claimed in claim 16, wherein the clutch is electrically actuated, and the clutch pressure is determined by the controller to correspond to a pressure applied to the clutch by an electrical actuator.

19. A controller as claimed in claim 18, wherein the pressure applied by the electrical actuator is determined in dependence on a value of electrical drive current provided to the actuator.

20. A hybrid electric vehicle comprising:
a controller;
an internal combustion engine and an electric machine operable to drive a driveline of the vehicle; and
a clutch that releasably couples the internal combustion engine to the driveline, wherein the clutch is operable between an open condition, in which the internal combustion engine is substantially disconnected from the driveline, and a closed condition in which the internal combustion engine is substantially connected to the driveline such that substantially all of the torque generated by the internal combustion engine is transmitted to the driveline;
wherein the controller is configured to control the vehicle to transition between a first mode, in which the clutch is in the open condition, and a second mode, in which the clutch is in the closed condition, and
wherein the controller is configured to provide, when a transition from the first mode to the second mode is required, a control signal to the internal combustion engine to control a speed thereof to achieve a target speed, wherein the target speed is greater than a speed of an output portion of the clutch, and wherein the control signal is responsive to the speed of the internal combustion engine and an amount of torque transfer provided by the clutch.

21. A vehicle as claimed in claim 20, wherein the clutch input portion is coupled to the internal combustion engine and the clutch output portion is coupled to the driveline.

22. A vehicle as claimed in claim 21, wherein the clutch output portion is coupled to the driveline via a transmission.

23. A vehicle as claimed in claim 22, wherein the clutch output portion is coupled to the driveline via the electric machine.

24. A vehicle as claimed in claim 23, wherein the clutch output portion is coupled to the transmission via the electric machine.

25. A controller as claimed in claim 1, wherein the controller is operable to begin the transition from the first mode to the second mode when the speed of the engine becomes equal to the speed of the output portion of the clutch.

26. A vehicle as claimed in claim 20, wherein the control signal is responsive to the speed of the internal combustion engine and the amount of torque transfer provided by the clutch, the amount of torque transfer being the proportion of the torque applied by the internal combustion engine to the clutch that is transmitted to the driveline.

27. A vehicle as claimed in claim 20, wherein the control signal is responsive to the speed of the internal combustion engine and the amount of torque transfer provided by the clutch, the amount of torque transfer being the magnitude of the torque transmitted by the clutch to the driveline.

28. A vehicle as claimed in claim 20, wherein the target speed is greater than that of the clutch output portion by an amount responsive to at least one selected from amongst a value of driver demanded torque, a speed of rotation of the output portion of the clutch and a selected gear ratio between the internal combustion engine and one or more wheels of the vehicle.

29. A vehicle as claimed in claim 20, wherein the target speed is greater than that of the output portion of the clutch by an amount in the range of one selected from amongst from 0 to 1000 revolutions per minute (rpm), from 10 to 1000 rpm, from 0 to 500 rpm and from 10 to 500 rpm.

30. A method of controlling a hybrid vehicle during a transition from a first mode, in which an electric machine is coupled to a driveline and an internal combustion engine is decoupled from the driveline by a clutch, to a second mode, in which the internal combustion engine is coupled to the driveline by the clutch, wherein the clutch comprises an input portion coupled to the engine, and an output portion coupled to the electric machine, wherein the clutch is operable between an open condition, in which the internal combustion engine is substantially disconnected from the driveline, and a closed condition, in which the internal combustion engine is substantially connected to the driveline, the method comprising:

controlling the vehicle to transition between the first mode, in which the clutch is in the open condition and the internal combustion engine is substantially disconnected from the driveline, to the second mode, in which the clutch is in the closed condition and the internal combustion engine is substantially connected to the driveline; and providing, when transition from the first mode to the second mode is required, a control signal to the internal combustion engine to control a speed thereof to achieve a target speed, wherein the target speed is greater than that of a speed of the output portion of the clutch, and wherein the control signal is responsive to the speed of the internal combustion engine and an amount of torque transfer provided by the clutch.

31. A method as claimed in claim 30, wherein the step of providing the control signal responsive to the speed of the internal combustion engine and the amount of torque transfer provided by the clutch is performed when it is required to connect the internal combustion engine to the driveline by the clutch.

32. A method as claimed in claim 30, wherein the transition from the first mode to the second mode begins when the speed of the internal combustion engine becomes equal to the speed of the output portion of the clutch.

\* \* \* \* \*